Oct. 16, 1923.  
G. A. SCHAPER  
EMERGENCY BOILER TUBE REPAIR PLUG  
Filed March 1, 1922

1,470,767

INVENTOR  
Gustav A. Schaper.  
Gustav A. Schaper.

Patented Oct. 16, 1923.

1,470,767

UNITED STATES PATENT OFFICE.

GUSTAV A. SCHAPER, OF NEW YORK, N. Y.

EMERGENCY BOILER-TUBE REPAIR PLUG.

Application filed March 1, 1922. Serial No. 540,184.

*To all whom it may concern:*

Be it known that I, GUSTAV ADOLPH SCHAPER, a citizen of the United States, residing at #209 West 97th Street, in the city of New York, State of New York, have invented an Emergency Boiler-Tube Repair Plug, of which the following is a specification.

My invention relates to a boiler tube repair plug, in which the plug is an internal expanding device, with a copper cup fitted snugly over the exterior of this plug forming a seal for steam and water; and the object of my invention is—first, to provide a water and steam tight plug, so that steam-heating plants especially may not be paralyzed for any length of time during the severe cold weather of winter; second, this device will enable any low pressure heating boiler to serve satisfactorily throughout the winter, so that any large repairs necessary on the tubes of the boiler, may be made at the appropriate time, in the summer.

I attain these objects by the mechanism illustrated in detail in the following drawing, in which.

Similar numerals refer to similar parts throughout the two (2) views.

Figure 1:
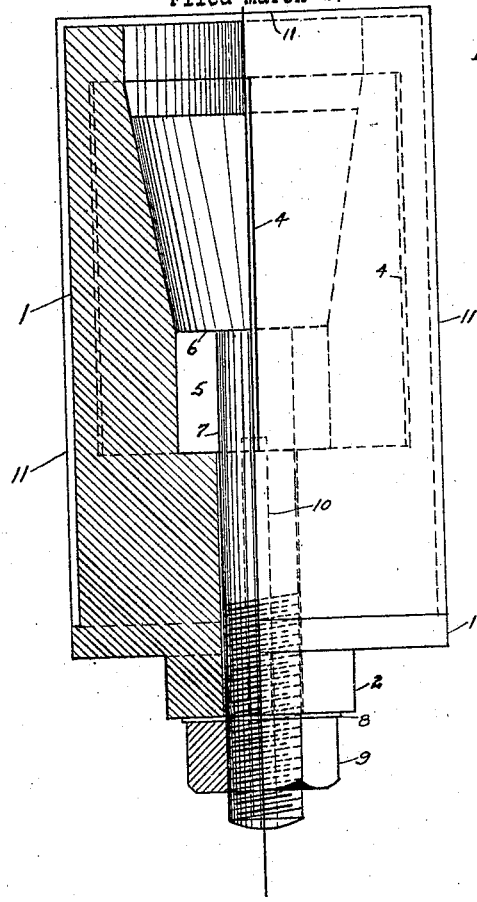
Figure 1 is a side elevation of the assembled plug, partly in section, to show the interior of the plug in detail.

The plug body 1 (see Figure 1) is made of malleable iron, over which is snugly fitted the copper cup 11, which comes into direct contact with the interior of the boiler tube, thereby acting as the seal.

Figure 2:
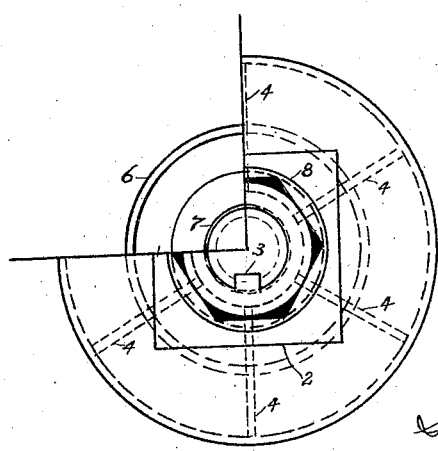
Figure 2 is a fragmentary front elevation of Figure 1, showing the divisions and lay-out of the milled slots making the expanding of the plug possible.

The wedge 6, is fastened onto bolt 7. Bolt 7 has a key-way 10, and is loosely fitted onto tongue 3 of the casted boss 2, (see Figure 2) which is part of the plug body 1. Tongue 3 is provided to prevent bolt 7 from turning when applying strain and force on the draw-nut 9, under which is placed a bearing washer 8 to relieve boss 2 of undue strain and stress.

To allow for clearance space for wedge 6 the space 5 (see Figure 1) has been provided.

Boss 2 has been made square so that the plug-body 1 can be held into position with one wrench while tightening and securing the draw-nut 9 with another wrench.

The diameter of this plug varies according to the sizes of the boiler tubes.

What I claim is:—

The combination of a tube end having a hole, circular in cross section, a similarly shaped cup of soft annealed metal fitted into the hole and a plug shaped to fit inside the soft metal cup, an outwardly projecting square shank on the plug, a screw-stem fitted onto an expanding wedge, said expanding wedge fitted to the interior of the plug, a washer on the screw-stem and bearing against the square shank of the plug and a nut on the screw-stem bearing against the washer.

GUSTAV A. SCHAPER.